United States Patent [19]

Suzuki et al.

[11] Patent Number: 5,586,122
[45] Date of Patent: Dec. 17, 1996

[54] TIME DIVISION MULTIPLE ACCESS MOBILE WIRELESS TELECOMMUNICATION SYSTEM

[75] Inventors: Toshiro Suzuki, Tama; Takao Harakawa, Fujisawa; Kazuhito Ishida; Izumi Horikawa, both of Yokohama, all of Japan

[73] Assignees: Hitachi, Ltd.; Matsushita Electric Industrial Co., Ltd., both of Japan

[21] Appl. No.: 350,664

[22] Filed: Dec. 7, 1994

[30] Foreign Application Priority Data

Dec. 10, 1993 [JP] Japan .................................. 5-310115

[51] Int. Cl.$^6$ ........................................................ H04J 3/00
[52] U.S. Cl. ................................................ 370/347; 370/500
[58] Field of Search .............................. 370/95.1, 95.3, 370/110.1, 98, 111, 85.6; 455/33.1, 54.1, 54.2, 58.1; 379/59, 60

[56] References Cited

U.S. PATENT DOCUMENTS

| | | | |
|---|---|---|---|
| 4,352,183 | 9/1982 | Davis et al. | 371/33 |
| 4,623,998 | 11/1986 | Kobayashi et al. | 370/98 |
| 4,748,616 | 5/1988 | Tanaka | 370/98 |

OTHER PUBLICATIONS

Public Notice, DA93-1278, issued Oct. 22, 1993.
Personal Handy Phone System, RCR Standrad, Version 1, RCR STD-28, Issued Dec. 20, 1993, Chapter, 1, pp. 1-103.

Primary Examiner—Douglas W. Olms
Assistant Examiner—Ajit Patel
Attorney, Agent, or Firm—Evenson, McKeown, Edwards & Lenahan P.L.L.C.

[57] ABSTRACT

In a time division multiple access mobile wireless telecommunication system, a base station has a plurality of frequencies with their priority order previously registered in a memory, selects, upon starting the operation, the frequency having the highest priority from frequencies not used by other wireless telecommunication systems, and initiates communications at the selected frequency. The base station also transmits a pilot signal representative of the priority for using the selected frequency in order to prevent other wireless telecommunication system from interrupting to use the frequency.

5 Claims, 6 Drawing Sheets

— BURST PAUSE SUB-FRAME
— PILOT SIGNAL TRANSMITTING SUB-FRAME
— COMMON CONTROL SIGNAL TRANSMITTING SUB-FRAME

| PRIORITY ORDER | FREQUENCY (MHz) | SLOT NO. |
|---|---|---|
| 1 | 1920.15 | 1 |
| 2 | 1921.40 | 1 |
| 3 | 1922.65 | 1 |
| 4 | 1923.90 | 1 |
| 5 | 1925.15 | 1 |
| 6 | 1926.40 | 1 |
| 7 | 1927.65 | 1 |
| 8 | 1928.90 | 1 |

TIME DIVISION MULTIPLE ACCESS MOBILE WIRELESS TELECOMMUNICATION SYSTEM

BACKGROUND OF THE INVENTION

The present invention relates to a time division multiple access mobile wireless telecommunication system.

Conventionally, as described in a publication entitled "PERSONAL HANDY PHONE SYSTEM, RCR STANDARD (PROPOSAL), VERSION 1" edited by Research & Development Center for Radio System and issued Mar. 17th 1993, particular slots in a frame are only used to transmit information.

If a variety of wireless telecommunication systems are simultaneously operated in the same communication area in the same frequency band, the systems possibly interfere with each other in communications. For this reason, in order to permit a variety of wireless telecommunication systems to operate in the same communication area in the same frequency band, it is necessary to confirm, before a terminal belonging to one of the systems transmits a radio wave, whether or not the frequency of the radio wave is currently being utilized by any other system for communications in the area. This confirmation action is called carrier sense. After confirming that the frequency is still available by performing the carrier sense, communications can be started. It is described in FCC (Federal Communications Commission) "PUBLIC NOTICE, DA 93-1278", issued Oct. 22, 1993, §15,321 (c)-(1) that isochronous device is required to confirm the above for a period of at least 10 msec. prior to initiating transmission.

However, even if a wireless telecommunication system starts communications after the availability of the frequency has been confirmed, this wireless telecommunication system could be interfered by an interrupt of communication signals generated by another wireless telecommunication system which would start communications in the same frequency band after the former wireless telecommunication system has started the communications.

Even if the former wireless telecommunication system continues the communications while continuously performing the carrier sense after it has started the communications in order to avoid such interference, since the carrier sense is performed only for a short time of approximately 10 ms, a wireless telecommunication system which transmits information with a frame of a longer time than the carrier sense time may admit interrupts by other wireless telecommunication systems in the same frequency band in the course of its communications. Consequently, the interference similar to the above cannot be prevented even if the carrier sense is performed. Thus, disadvantageously, it is necessary to previously establish countermeasures to be taken in case an interrupt by another wireless telecommunication system into the same frequency is found.

Also, in a wireless telecommunication system which provides a plurality of cells, i.e., communication areas in each of which personal stations are allowed to communicate with a base station installed therein, a common control signal for commonly controlling the plurality of cells must be transmitted at the same frequency but in different time slots among these cells, such that the common control signal can be easily and rapidly captured even when a personal station moves from a cell to another. However, if this common control signal frequency channel has already been occupied by another wireless telecommunication system in a cell, the wireless telecommunication systems cannot at all utilize the frequency.

Assuming that a terminal in a wireless telecommunication system performs the carrier sense over a time corresponding to the length of a frame defined in the system, if the frame is relatively long, the probability that a frequency, which is intended to be utilized in any of time slots within the frame, has already been utilized by another wireless telecommunication system becomes extremely high, resulting in a fear that a frequency channel required for the wireless telecommunication system itself cannot be captured.

SUMMARY OF THE INVENTION

It is an object of the present invention to provide a time division multiple access mobile wireless telecommunication system which is capable of stably continuing communications, without being interfered by other wireless telecommunication systems, even if the mobile wireless telecommunication system utilizes a frame having a length longer than a carrier sense time.

It is another object of the present invention to provide a time division multiple access mobile wireless telecommunication system including a plurality of cells which is capable of rapidly and stably controlling communications in the entire system even if the same frequency is occupied by another wireless telecommunication system in a cell.

According to the system provided by the present invention, the first object is achieved in the following manner. First, a frame period of time Tf longer than a carrier sense period of time Ts is divided into Nfs of sub-frames each having a sub-frame period of time shorter than the carrier sense time Ts. Then, the carrier sense is performed to confirm an empty frequency channel on which communications are subsequently started. Simultaneously, a pilot signal, serving as a priority claiming signal for utilizing a frequency for use in communications, is transmitted in a sub-frame other than the sub-frame for communications to prevent other wireless telecommunication systems from interrupting into the same frequency.

The second object, in turn, is achieved in the following manner. A plurality of communication frequency channels for transmitting and receiving communication information between base stations and personal stations are previously prepared and registered in the system. It is assumed in principle that the wireless telecommunication system starts communications on the frequency channel having the highest priority. In a cluster including all cells of the wireless telecommunication system, if the selected frequency channel is being utilized by another wireless telecommunication system in any cell so that the wireless telecommunication system cannot utilize the selected frequency channel for communications, the frequency channel having the next highest priority is selected from the plurality of registered communication frequency channels and separately set in the cell.

As described above, according to the present invention, each base station performs the carrier sense upon starting communications, selects an unused frequency channel in the order of priority from registered communication frequency channels, and starts the communications on the selected frequency channel. The communications are executed using a communication sub-frame having a period shorter than the carrier sense time, and the pilot signal for claiming the priority for utilizing the selected frequency channel is transmitted to other wireless telecommunication systems. Furthermore, since the empty frequency channel having the next highest priority within the registered communication frequency channels can be utilized to start communications when the frequency channel having the highest priority has been utilized by another wireless telecommunication system in a cell within a cluster, the communication service can be stably provided without being interfered by other wireless telecommunication systems.

DESCRIPTION OF THE PREFERRED EMBODIMENT

The present invention will hereinafter be described in detail in connection with a preferred embodiment thereof with reference to the accompanying drawings.

Figure 1A:
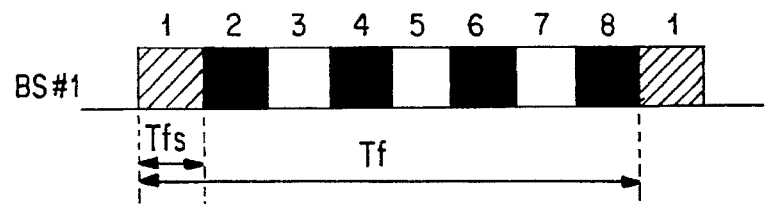
FIGS. 1A–D is a diagrams showing communication timing in a frame when transmission and reception are performed at a plurality of base stations in a wireless telecommunication system according to the present invention.
Figure 1B:
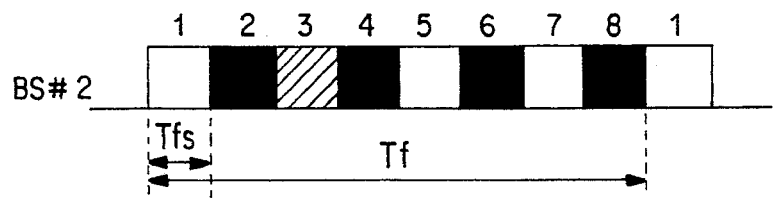
Figure 1C:
Figure 1D:
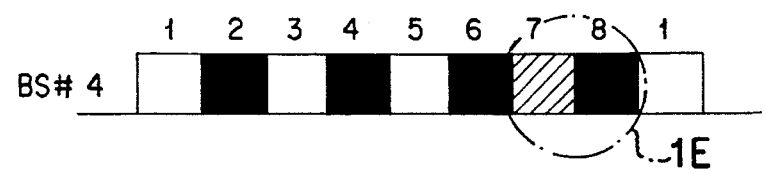

FIGS. 1A–D illustrate communication timing when a plurality of base stations perform communications at the same frequency in a cluster including four cells, wherein the abscissa represents the time, and the ordinate the magnitude of a communication signal inserted into each time slot, i.e., a burst signal. FIG. 1A shows a communication frame having a period Tf, where each frame consists of eight sub-frames having a period Tfs, each of which consists of eight time slots. Viewed from a base station, the former four time slots in each sub-frame are assigned to transmission, and the latter four time slots to reception. Thus, assuming, for example, that one frame has a period of 40 msec, one sub-frame is calculated to be 5 msec, and one time slot to be 625 μsec.

Figure 3:
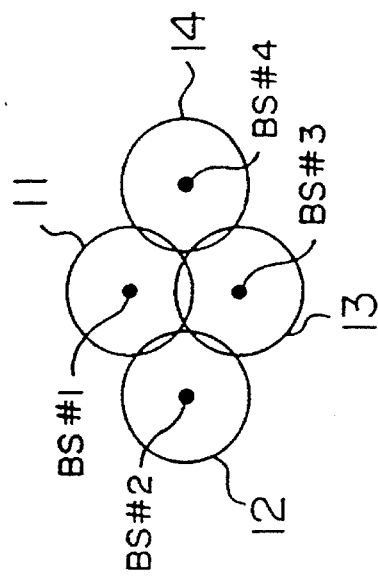
FIG. 3 is a conceptual diagram showing the relationship between cells and base stations in a cluster of the wireless telecommunication system according to the present invention.

FIGS. 1A–D shows transmission/reception timing for an exemplary configuration including four base stations BS#1–BS#4 in a cluster and four cells 11–14 surrounding them, as shown in FIG. 3. The four base stations utilize a common communication frequency channel, i.e., a common control channel. The four communication channels utilize different sub-frames for communications by establishing the synchronization with the same frequency channel and shifting the timing. FIGS. 1A–D show the transmission/reception timing of the four base stations BS#1–BS#4, respectively.

The timing of the first base station BS#1 is shown in FIG. 1A. A common control signal, for controlling the communications in the cluster to be enabled on the common control channel, is transmitted in a first slot of a first sub-frame from the first base station, while other odd-numbered sub-frames are not used in the first base station because they are used by the other base stations for transmitting the common control signal. More specifically, the second, third and fourth base stations transmit the common control signal in a first slot of respective third, fifth and seventh sub-frames, as shown from FIGS. 1A through 1D. A pilot signal, for claiming the priority to use a specific frequency channel, is transmitted in a first slot of all even-numbered sub-frames from all the base stations. FIG. 1F is a diagram for explaining what are represented by the patterns of the sub-frames used in FIG. 1A.

Figure 1E:
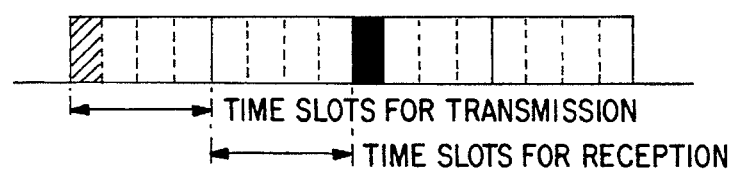
FIG. 1E is a more detailed diagram which shows the configuration of a subframe in FIG. 1D.
Figure 1F:
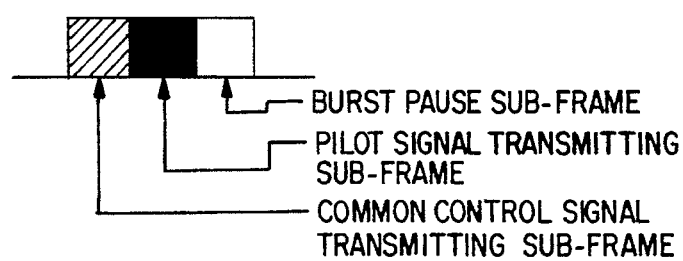
FIG. 1F is a diagram for explaining what are represented by the patterns of the sub-frames used in FIGS. 1A–D.

FIG. 1E shows in detail the configuration of the sub-frame. Each sub-frame consists of each four time slots for transmission and for reception, and the common control signal or the pilot signal is transmitted in the first one of these time slots. The remaining time slots are used for transmission or reception of information data.

In each cell, a personal station, when receiving the common control signal transmitted from the base station, operates in response thereto. The personal station may also be made to respond to the pilot signal. Since the common control signal is already known by the RCR STANDARD, detailed description thereon will not be given here.

Figure 2:
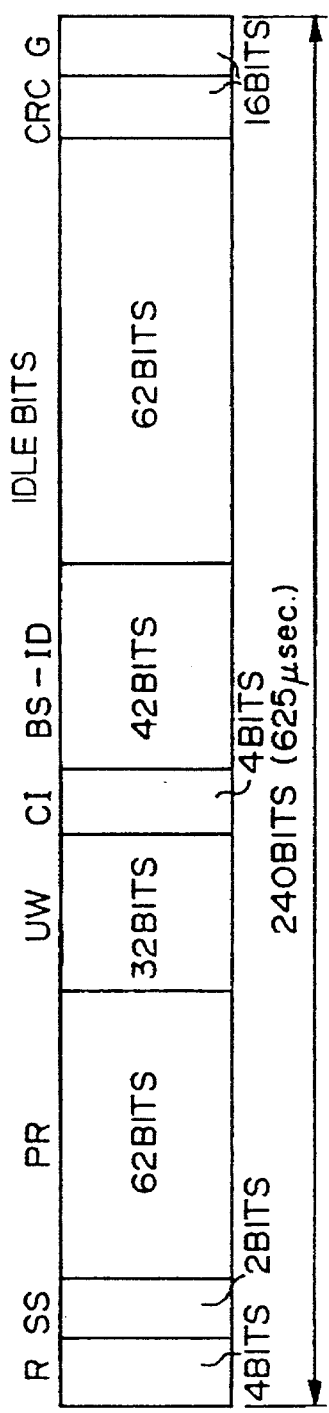
FIG. 2 shows a format for a pilot signal.

FIG. 2 is a diagram showing a format of the pilot signal. In FIG. 2, R denotes a ramp time field having a time corresponding to four bits; SS a start symbol field having two bits; and PR a preamble field having 62 bits. SS and PR include repetitions of 1001. UW denotes a unique word field having 32 bits which represent each digit of a hexadecimal number 50EF2993 with four bits. CI denotes a channel identifier field having four bits, and BS-ID is a field of 42 bits representing an identifier of an associated base station whose bit structure is unique every base station to identify all the base stations in the system. An Idle bit field has, for example, 62 bits all set to "0". CRC denotes an error correcting code field having 16 bits. G denotes a field provided for preventing interference between adjacent slots and has a time corresponding to 16 bits.

Figure 4:
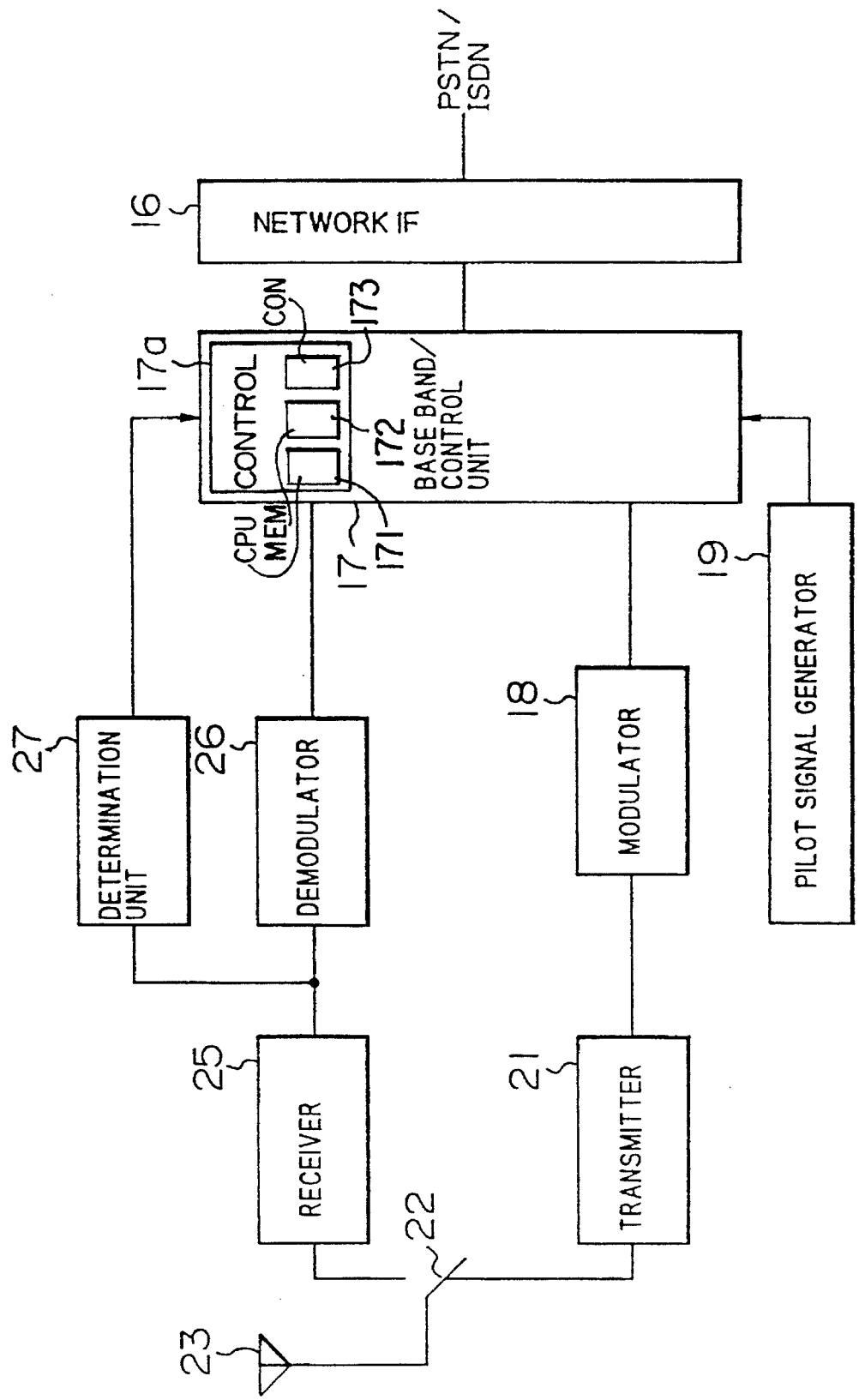
FIG. 4 is a block diagram showing the circuit configuration of a base station according to the present invention.

FIG. 4 is a block diagram showing the configuration of the base station. In FIG. 4, a network interface 16, connected to a telephone network PSTN/ISDN, couples the telephone network with a base band/control unit 17. A pilot signal generator 19 generates the pilot signal, serving as a priority claiming signal for utilizing a frequency channel. The base band/control unit 17 is connected to the network interface 16 and the pilot signal generator 19. The base band/control unit 17 comprises a controller 17a having a CPU 171, a memory 172 and a control circuit 173, which performs signal conversion between a signal transmitted on the telephone network and information data on the wireless telecommunication system as well as generates the common control signal and inserts the pilot signal from the pilot signal generator 19 and the common control signal into predetermined time slots. In addition, this controller 17a controls the operation of the whole circuit configuration of the base station shown in FIG. 4. Data signals including information data generated by the base band/control unit 17, common control signal and pilot signal are subjected to (π/4) QPSK (π/4 shift quadrature phase-shift keying) modulation in a modulator 18.

A transmitter 21 converts the data signals modulated by the modulator 18 from the base band frequency to transmission frequency and transmits the converted data signals through a change-over switch 22 from an antenna 23. The change-over switch 22 is alternately switched between the transmitter 21 side and the receiver 25 side by the controller 17a every four time slots, as shown in FIG. 1E.

In reception, the change-over switch 22 has its contact switched to the receiver 25 side. A received signal is received by the receiver 25, demodulated from a QPSK signal to a data signal by a demodulator 26 and transferred to the base band/control unit 17. The base band/control unit 17 converts the data signal to a transmission signal suitable to the telephone network which is sent onto the telephone network through the network interface 16.

A determination unit 27 determines whether an empty frequency channel exists based on the signal received by the receiver 25, and, when confirming that an empty channel exists, informs the controller 17a of this fact.

Figure 5:
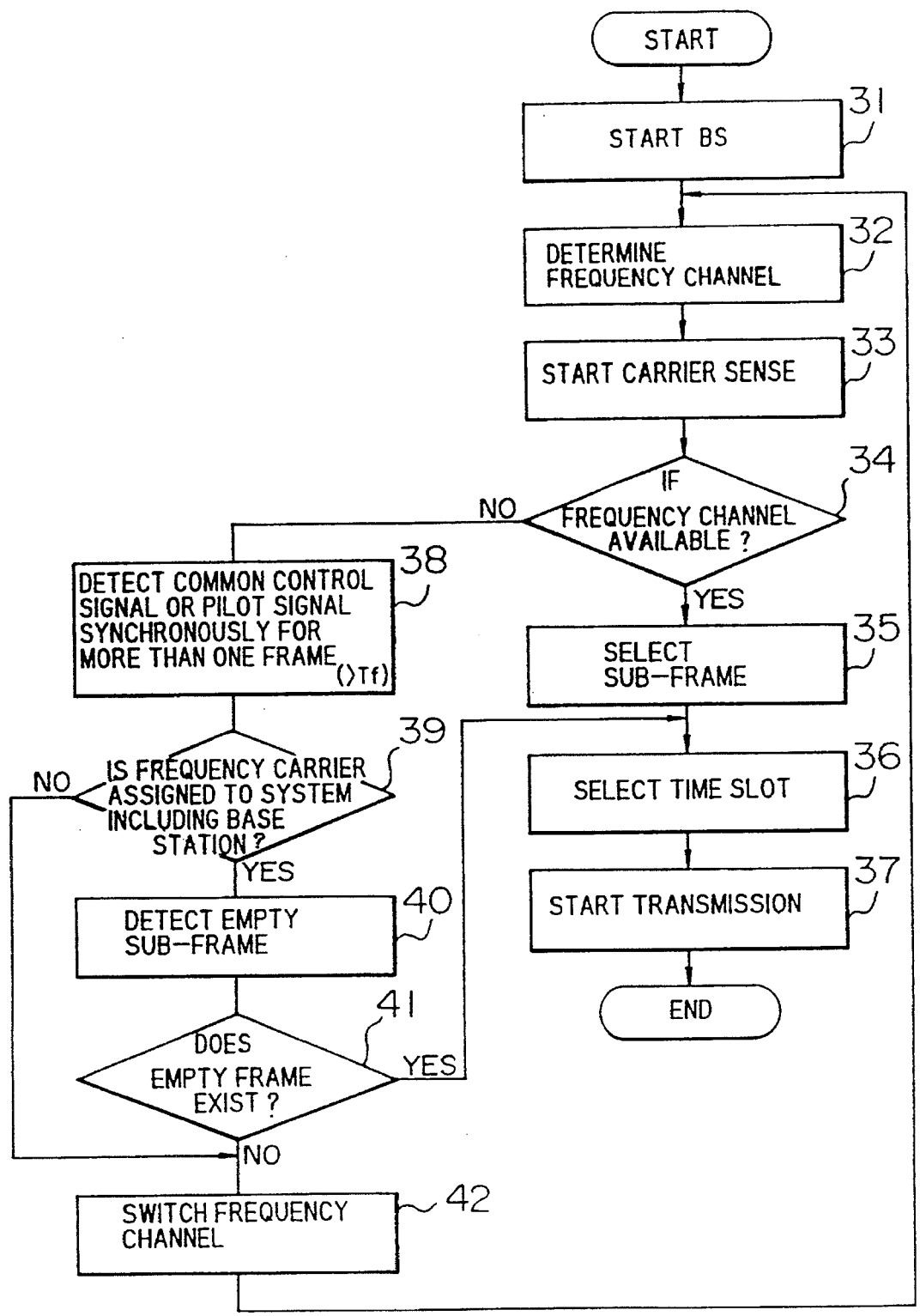
FIG. 5 is a flow chart showing the operation of a controller in FIG. 4 when it is started.
Figures 6, 7:
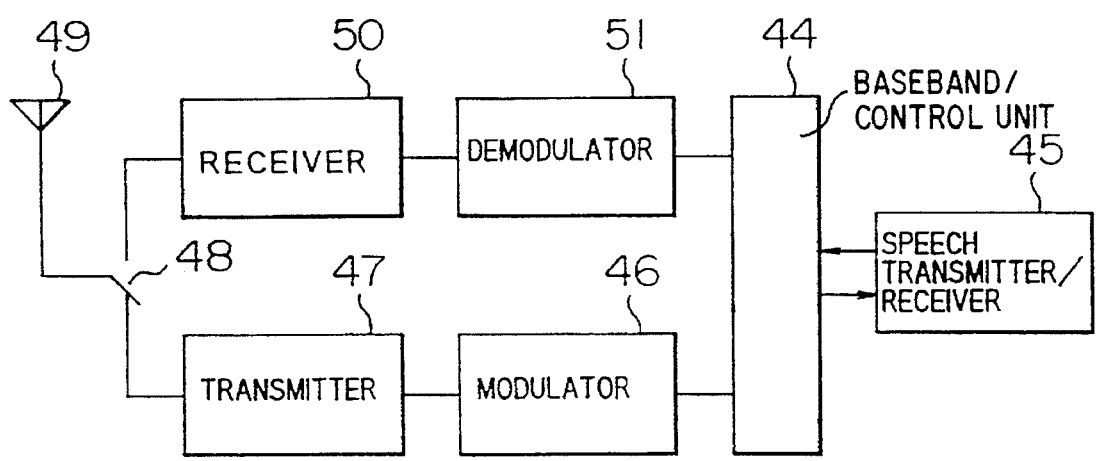
FIG. 6 is a table listing frequencies, priority order and used time slot numbers of a plurality of frequency channels which have been registered in a memory of the controller.
FIG. 7 is a block diagram showing the circuit configuration of a personal station.

FIG. 5 is a flow chart showing the operation of the mobile wireless telecommunication system according to the present invention when it is started. Each of the base stations in the cluster has a plurality of frequency channels with the priority order determined hereto previously registered in the memory arranged in the controller 17a, as shown in FIG. 6. When any of the base stations in the cluster is started at step 31, the frequency channel with the highest priority is determined from the plurality of frequency channels registered in the memory at step 32.

Next, at step 33, the change-over switch 22 is switched to the receiver 25 side over a period Ts which is shorter than one frame period Tf and longer than one sub-frame period Tfs, to start the carrier sense. Then, at step 34, it is determined in the determination unit 27 whether or not the frequency channel determined at step 32 is available. Specifically, the determination unit 27 comprises a rectifier circuit and comparator circuit for comparing the rectified voltage with a threshold level. The determination unit generates at its output a high level signal when the same frequency channel is being used by another wireless telecommunication system. Thus, at step 34, No is determined when the output of the determination unit 27 is at high level indicating that the frequency channel is not available, while YES is determined when the output of the determination unit 27 is at low level.

When YES is determined at step 34, a sub-frame to be utilized by the base station is selected at step 35, a time slot in the sub-frame is selected for communications of the base station at step 36, and the base station starts the transmission at step 37.

Conversely, when NO is determined at step 34, demodulator 26 tries to synchronously detect the common control signal or the pilot signal at step 38 over a period longer than the one-frame period Tf. Here, the carrier sense is executed over a period longer than the one-frame period in order to detect whether or not a frequency carrier is one assigned to the wireless telecommunication system to which the base station belongs. If the common control signal or the pilot signal for the wireless telecommunication system including the base station is not detected as a result of the synchronous detection, it is determined at step 39 that the frequency carrier is being utilized by another wireless telecommunication system, and the frequency channel with the next highest priority is selected at step 42, followed by returning to step 32, where the newly selected frequency channel is determined.

When it is determined at step 39 that its own common control signal is detected, an empty sub-frame without common control signal or pilot signal is detected at step 40 based on the detected common control signal. Then, if it is determined at step 41 that an empty frame exists, the flow jumps to step 36 to select a time slot in the empty sub-frame as a time slot for communications of the base station, with which the communications are started at step 37. Conversely, if it is determined at step 41 that no empty sub-frame exists, the flow proceeds to step 42 to switch to the frequency channel with the next highest priority.

In this way, when communications have been started at a base station, other base stations located adjacent to this base station and belonging to the same wireless telecommunication system, which are started later than this base station, begin their operations in accordance with the flow chart shown in FIG. 5 to initiate transmission through steps 38, 39, 40, 41. In this way, each of the base stations in the cluster belonging to the same wireless telecommunication system starts its operation in a chain reaction manner, and consequently the whole cluster is set in a predetermined communication controlled state. Incidentally, the base stations can scramble data signals before transmitting them. In this case, personal stations need to descramble received data signals. The scramble and descramble of data signals may be implemented by conventionally known methods.

The personal station has a circuit configuration as shown in FIG. 7. A base band/control unit 44 having a CPU, a memory and so on is connected to a speech transmitter/receiver 45. Recorded in the memory of the base band/control unit 44 is a table similar to that of the base station, listing frequencies, priority order and numbers of used time slots for a plurality of frequency channels, as shown in FIG. 6. For transmission, a speech signal from the speech transmitter/receiver 45 is converted to a data signal on the wireless telecommunication system and then transferred to a modulator 46. The modulator 46 modulates the signal transferred thereto, and the modulated signal is transmitted by a transmitter 47 through a change-over switch 48 from an antenna 49. On the other hand, for reception, the change-over switch 48 is switched to the receiver 50 side by the action of the base band/control unit 44. A received signal from the receiver 50 is demodulated by a demodulator 51, converted to a speech signal by the base band/control unit 44, and sent to the speech transmitter/receiver 45. It is understood that the modulator 46, transmitter 47, receiver 50 and demodulator 51 perform the same operations as circuit portions having the same names which have been explained in FIG. 4.

Figure 8:
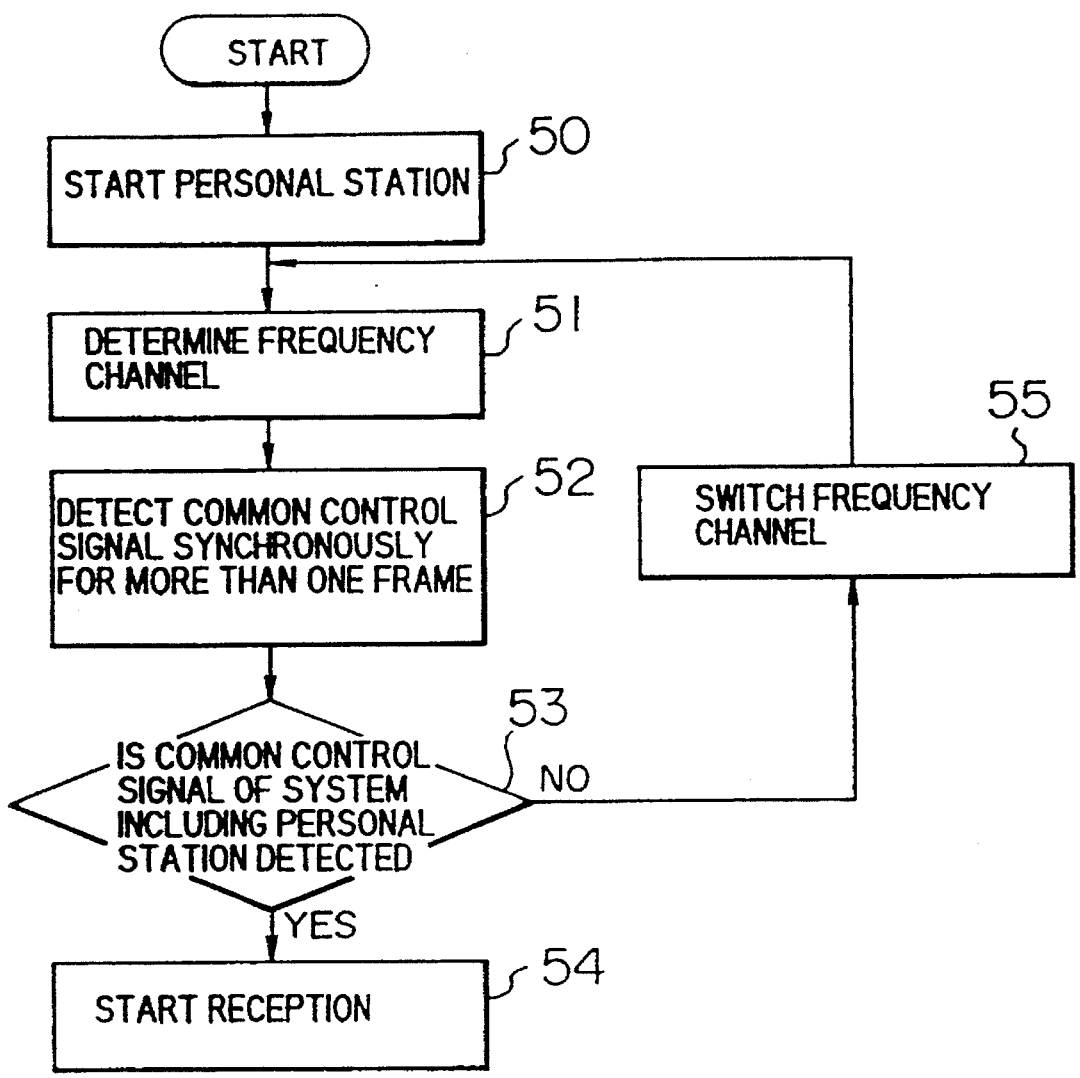
FIG. 8 is a flow chart for explaining the operation of a controller in the personal station.

Next, the operation of the base band/control unit 44 in the personal station shown in FIG. 7 will be explained with reference to FIG. 8. When the personal station is started at step 50, the frequency channel having the highest priority is determined from frequency channels registered in the memory of the base band/control unit 44 at step 51, and the personal station tries to synchronously detect the common control signal on this frequency channel over a period longer than the one-frame period at step 52. If the personal station detects at step 53 the common control signal of the wireless telecommunication system to which it belongs, YES is determined, and reception is started at step 54. Conversely, if NO is determined at step 53, the frequency channel having the next highest priority is read at step 55, followed by the flow returning to step 51.

In this way, the personal station can favorably maintain the reception in an arbitrary cell while automatically detecting the frequency carrier of the wireless telecommunication system to which it belongs.

While the present invention has been described in connection with an embodiment which has four base stations provided in a wireless telecommunication system, the number of base stations is not limited if the frame length is extended as the number of base stations is increased. Also, if the number of base stations is excessive in comparison with the frame length, another frequency channel may be assigned to some of the base stations, so that stable communications can be carried out without incurring particular difficulties. Also, while the present invention has been described in connection with an embodiment where the number of time slots is four for each of transmission and reception, the present invention is not limited to this particular number of time slots, but an arbitrary number of time slots may be provided.

As described above, in an area in which a variety of wireless telecommunication devices coexist, the carrier sense is performed before starting communications to detect an available frequency channel to be utilized for the communications of the wireless telecommunication system to which a base station or a personal station belongs. Further, for preventing other wireless telecommunication systems from interfering with the communications on the detected frequency channel, a pilot signal for claiming the priority for using the frequency channel is continuously transmitted to prohibit other wireless telecommunication systems from interrupting the frequency channel. In this way, stable communications can be accomplished without interference by other wireless telecommunication systems.

We claim:

1. A time division multiple access mobile wireless telecommunication system comprising a plurality of personal stations and at least one base station, wherein:

said base station includes:

a memory in which a plurality of frequencies are registered with previously determined priority order;

frequency channel selecting means for selecting, from the frequencies registered in said memory, frequency which is not being utilized by any other wireless telecommunication system and has the highest priority, when said base station starts communication;

means for generating a pilot signal for claiming the priority for utilizing said selected frequency;

means for generating a common control signal for controlling said wireless telecommunication system;

means for inserting the pilot signal from said pilot signal generating means and the common control signal from said common control signal generating means respectively at intervals of a predetermined period, using said selected frequency, and for transmitting said pilot signal and said common control signal together with a communication signal to be transmitted, and each of said personal stations includes:

means for receiving said pilot signal, said common control signal and said communication signal from said base station, said means for receiving operating in response to at least one of said common control signal and said pilot signal.

2. A system according to claim 1, wherein a plurality of said base stations are arranged to form a cluster.

3. A system according to claim 2, wherein said frequency channel selecting means further comprises:

system determining means for determining, when detecting the same frequency as that of a selected frequency channel, whether or not the selected frequency channel is a frequency channel assigned to the wireless telecommunication system to which the base station belongs, based on said common control signal and said pilot signal; and means for determining an empty time slot for communications of the base station when said system determining means determines that the selected frequency channel is assigned to the wireless telecommunication system to which the base station belongs.

4. A system according to claim 1, wherein:

a communication frame of said wireless telecommunication system is divided into a plurality of sub-frames, and a carrier sense time in said frequency channel selecting means is set to be shorter than a period of said communication frame and at least as long as a period of one of said sub-frames.

5. A system according to claim 4, wherein:

each of said sub-frames includes a plurality of time slots, and said pilot signal is inserted into at least one time slot in every predetermined number of said sub-frames.

* * * * *